(12) United States Patent
Ding et al.

(10) Patent No.: US 11,733,070 B2
(45) Date of Patent: Aug. 22, 2023

(54) STREET LIGHT OPERATING STATUS MONITORING USING DISTRIBUTED OPTICAL FIBER SENSING

(71) Applicant: NEC LABORATORIES AMERICA, INC, Princeton, NJ (US)

(72) Inventors: Yangmin Ding, East Brunswick, NJ (US); Sarper Ozharar, Princeton, NJ (US); Yue Tian, Princeton, NJ (US); Ting Wang, West Windsor, NJ (US); Yuanda Xu, Jersey City, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/684,348

(22) Filed: Mar. 1, 2022

(65) Prior Publication Data

US 2022/0283001 A1    Sep. 8, 2022

Related U.S. Application Data

(60) Provisional application No. 63/155,831, filed on Mar. 3, 2021.

(51) Int. Cl.
*G01D 5/353* (2006.01)
*G01H 9/00* (2006.01)

(52) U.S. Cl.
CPC ......... *G01D 5/35358* (2013.01); *G01H 9/004* (2013.01)

(58) Field of Classification Search
CPC ..... G01D 5/35358; G01H 9/004; H05B 47/22
See application file for complete search history.

(56) References Cited

U.S. PATENT DOCUMENTS

| | | | | |
|---|---|---|---|---|
| 5,235,252 A | * | 8/1993 | Blake | H05B 47/20 315/159 |
| 5,355,208 A | * | 10/1994 | Crawford | G01H 9/004 356/35.5 |
| 2010/0007354 A1 | * | 1/2010 | Deaver, Sr. | G01R 31/52 324/539 |
| 2021/0318163 A1 | * | 10/2021 | Ding | G08B 21/182 |
| 2021/0318504 A1 | * | 10/2021 | Tian | G01H 9/004 |
| 2022/0397449 A1 | * | 12/2022 | Iwano | G01H 9/004 |
| 2023/0029221 A1 | * | 1/2023 | Ding | G01H 9/004 |

\* cited by examiner

*Primary Examiner* — Jonathan M Hansen
(74) *Attorney, Agent, or Firm* — Joseph Kolodka

(57) ABSTRACT

Distributed fiber optic sensing (DFOS)/distributed acoustic sensing (DAS) techniques coupled with frequency domain decomposition (FDD) are employed to determine the presence of 120 HZ operating power frequency to determine when street lights are energized and on thereby providing continuous status monitoring of the operational status of street lights and locating affected street lights at a particular utility pole location.

10 Claims, 4 Drawing Sheets

STREET LIGHT OPERATING STATUS MONITORING USING DISTRIBUTED OPTICAL FIBER SENSING

CROSS REFERENCE TO RELATED APPLICATIONS

This application claims the benefit of U.S. Provisional Patent Application Ser. No. 63/155,831 filed 3 Mar. 2021 the entire contents of which is incorporated by reference as if set forth at length herein.

TECHNICAL FIELD

This disclosure relates generally to distributed optical fiber sensing. More particularly, it pertains to infrastructure monitoring including street light monitoring using distributed fiber optic sensing.

BACKGROUND

As will be understood and appreciated by those skilled in the art, lighting—and in particular street lighting—plays an important role in improving safety and security in urban and other areas thereby providing residential desirability and promoting nighttime business activity. As such, street lighting has been recognized as one of the most actionable and ready to implement technologies in smart city applications. To implement street lighting that facilitates such smart city application, continuous monitoring of the status of individual street lights is a critical and indispensable step.

Currently, utility companies rely on resident/pedestrian reporting of street light outage. As will be appreciated, such outage reporting necessarily requires knowledge of the location and status of affected street light(s). Such location information will oftentimes require a pole number, and when such pole number is not available, a full address proximate to the affected street light(s) is necessary.

SUMMARY

An advance in the art is made according to aspects of the present disclosure directed to street light operating status monitoring using distributed fiber optic sensing (DFOS).

In sharp contrast to prior art, distributed fiber optic sensing (DFOS)/distributed acoustic sensing (DAS) techniques coupled with frequency domain decomposition (FDD) are employed to determine the presence of 120 HZ operating power frequency to determine when street lights are energized and on thereby providing continuous status monitoring for the operational status of street lights. As noted previously with respect to FIG. 2, the system may advantageously utilize existing telecommunication fiber optics (cable) as a distributed sensor to capture the response of the cable under AC power, including the following featured steps.

BRIEF DESCRIPTION OF THE DRAWING

A more complete understanding of the present disclosure may be realized by reference to the accompanying drawing in which.

Figure 1:
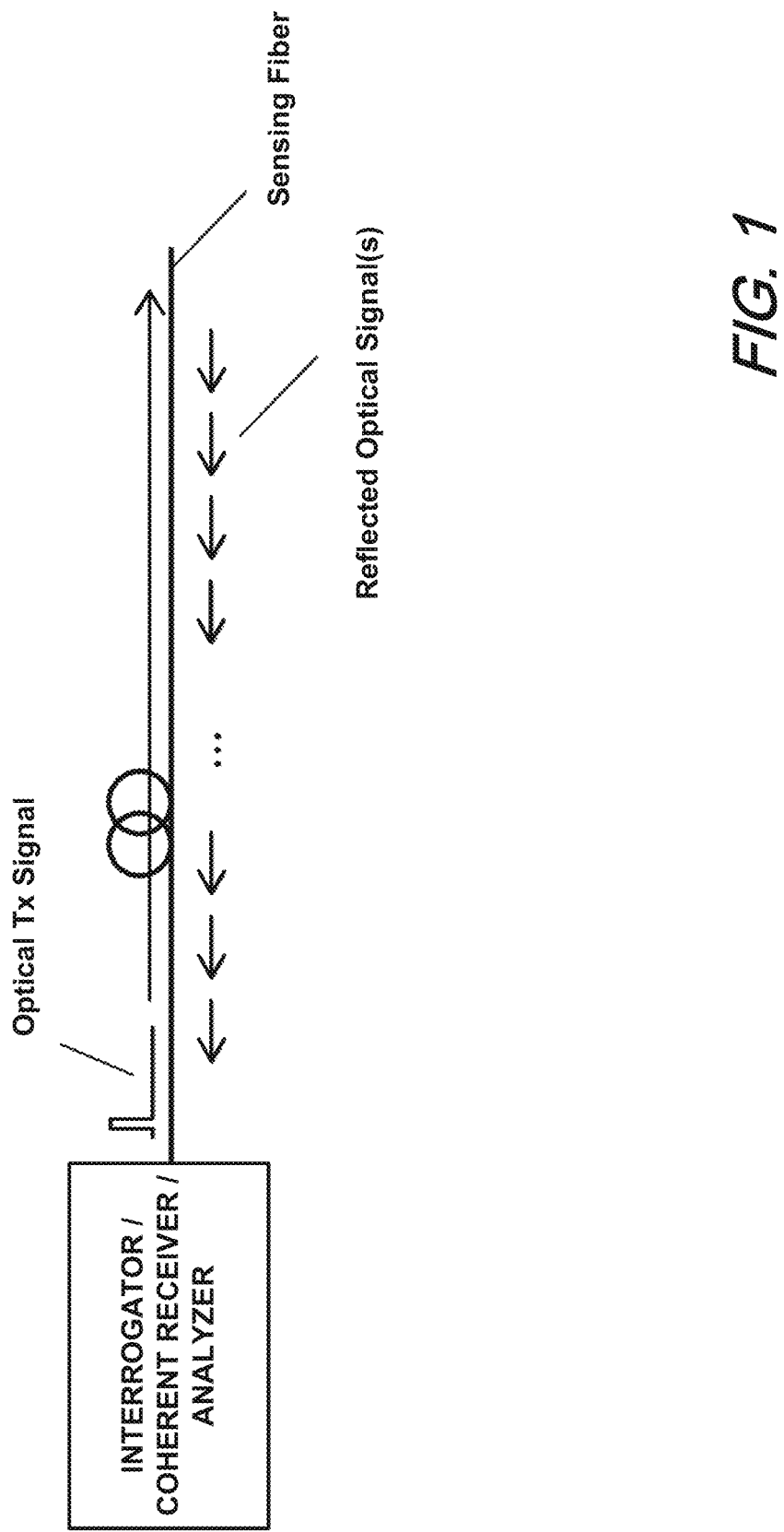
FIG. 1 is a schematic diagram of an illustrative prior art distributed fiber optic sensing system.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

As used herein, the terms distributed fiber optic sensing and distributed optical fiber sensing are used interchangeably.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a prior art distributed fiber optic sensing system is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Rayleigh back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters). Acoustic disturbance acting on the sensor fiber generates microscopic elongation or compression of the fiber (micro-strain), which causes a change in the phase relation and/or amplitude of the light pulses traversing therein.

Before a next laser pulse is be transmitted, a previous pulse must have had time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically half of the pulse rate. As higher frequencies are attenuated very quickly, most of the relevant ones to detect and classify events are in the lower of the 2 kHz range.

In the very low frequency range, phase-based C-OTDR systems enable the highly sensitive measurement of transient temperatures due to the elongation/compression of the fiber with temperature changes. This measurement mode is called Distributed Temperature Gradient Sensing (DIGS) and is well-known in the oil & gas industry.

Distributed Temperature Sensing (DTS) uses optical sensing fiber—typically over lengths of several kilometers—that functions as linear temperature sensors. The operational result is a continuous temperature profile along the entire length of the sensor fiber. DTS utilizes a Raman effect to measure temperature. The intensity of Raman scattering is a measure of temperature along the fiber length. A Raman anti-Stokes signal changes its amplitude significantly with changing temperature.

The position or location along the length of the fiber of the temperature measurement is determined by measuring arrival timing of a returning scattered/reflected light pulse. This method involving arrival time measurement is called Optical Time Domain Reflectometry (OTDR).

Other DTS technologies use Brillouin backscatter (B-OTDR or B-OTDA), which carries strain and temperature information. Such systems are also called DTSS (Distributed Temperature and Strain Sensing). The challenge with these systems is to isolate the fiber from strain to get accurate temperature information.

As previously noted, street lighting is an important component of safety and security in residential and/or business areas. To implement "smart" street lighting, continuous monitoring of the status of individual street lights is a critical and indispensable operational characteristic.

Currently, utility companies heavily rely on human reporting of street light outages including information about the location of any affected light(s). It is important to provide information regarding the location and status of the street light. In addition to location, it is also useful to provide a current condition of the street light such as: Besides, it is helpful to report the current condition of the streetlight such as: whether a street light is out; whether a street light is going on and off; whether a street light is on during the day; whether a street light is making unusual sounds; and, are the light(s), and/or the pole(s) missing?

As we shall show and describe the instant invention according to aspects of the present disclosure is a system that monitors working status (lights on/off) of street light(s) by distributed fiber optic sensing. Additionally, once an abnormal status, operation or outage of a street light is detected, our inventive approach can advantageously provide the location of the affected street light(s). As such, our inventive approach provides for the individual monitoring and maintenance of street lights thereby eliminating field examination by service personnel.

Figure 2:
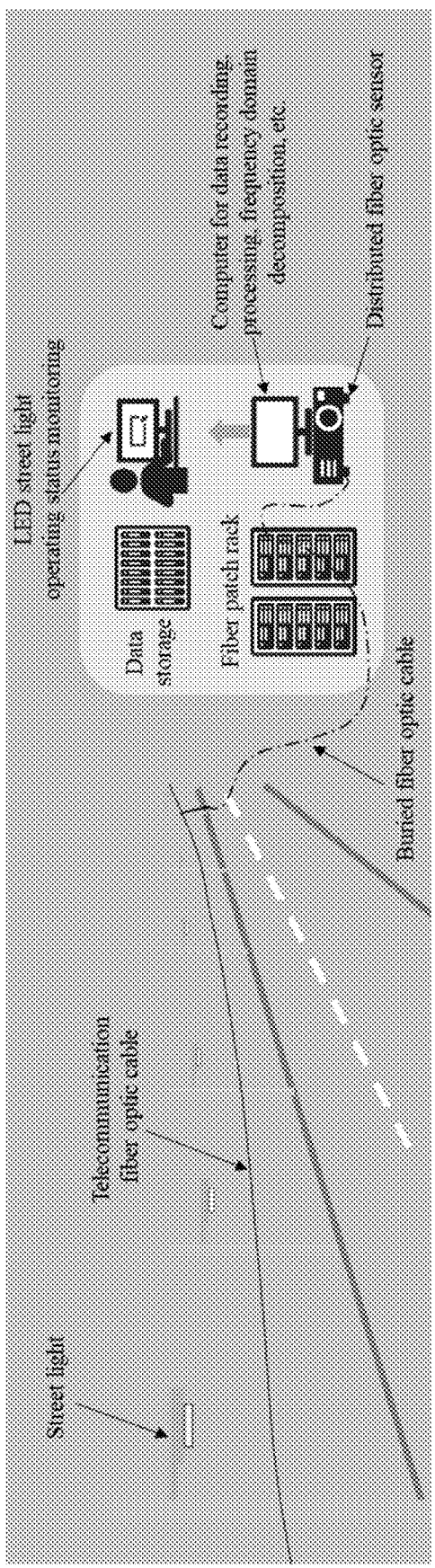
FIG. 2 is a schematic diagram of an illustrative street light status monitoring based on distributed fiber optic sensing (DFOS)/distributed acoustic sensing (DAS) according to aspects of the present disclosure.

FIG. 2 is a schematic diagram of an illustrative street light status monitoring based on distributed acoustic sensing (DAS) according to aspects of the present disclosure. prior art distributed fiber optic sensing system.

As may be observed from that figure, a telecommunications fiber optic cable including optical fibers is shown suspended from a series of utility poles. As shown further, the utility poles also support a street light—that generally operate at commercial electrical power operational characteristics. Such an arrangement of utility poles, telecommunications fiber optic(s) and street lights oftentimes are located adjacent to roadways and/or highways for convenience as well as to provide additional lighting to the highway surfaces.

Shown further is a street light monitoring facility that may advantageously be remotely located and optically connected to the telecommunications fiber optic by a fiber optic cable that in the illustration is shown as buried underground. Such monitoring facility advantageously includes an interrogator as previously described and generally known in the art as well as additional computer/computational facilities for data recording, processing, frequency domain decomposition (FDD), etc., that advantageously may control and analyze DFOS/DAS systems that utilize the telecommunication fiber optic as a DAS sensor.

As will be understood and appreciated by those skilled in the art, the operating frequency of street lights is mainly determined by the power frequency of the main electrical supply. In the US, the grid frequency is 60 Hz, which describes an alternating cycle of 60 oscillations between negative and positive poles per second. Therefore, the operating frequency of a light bulbs is subsequently double the power frequency, 120 Hz, and results from rectifying AC power.

Generally, street light(s) are controlled (on/off) by a photo detector determining/triggering and/or a time of day system. When so triggered, the street light is triggered to allow electrical power to energize the street light when ambient light level falls below a certain value and then switch the supply off (de-energize the light) when the ambient light level reaches another threshold value.

Given this operation, and according to aspects of the present disclosure, by detecting the 120 Hz vibrations from collected DAS data, we can monitor the operating status of street lights—for example—whether such lights is/are on during the day, or the lights is/are out during the night.

Advantageously, DFOS/DAS can additionally determine/provide distance(s) between a target street light and DAS interrogator that may be centrally located in a status monitoring location as previously noted. Operationally, the geographical location of a target street light and utility pole (tag number) may be pre-determined during a one-time field survey of location(s).

Operationally, a key principle according to the present disclosure is that DAS and FDD are employed to determine the presence of 120 HZ when lights are energized and on (illuminating) thereby providing continuous status monitoring for the operational status of street lights. As noted previously with respect to FIG. 2, the system may advantageously utilize existing telecommunication fiber optics (cable) as a distributed sensor to capture the response of the cable under AC power, including the following featured steps.

Figure 3:
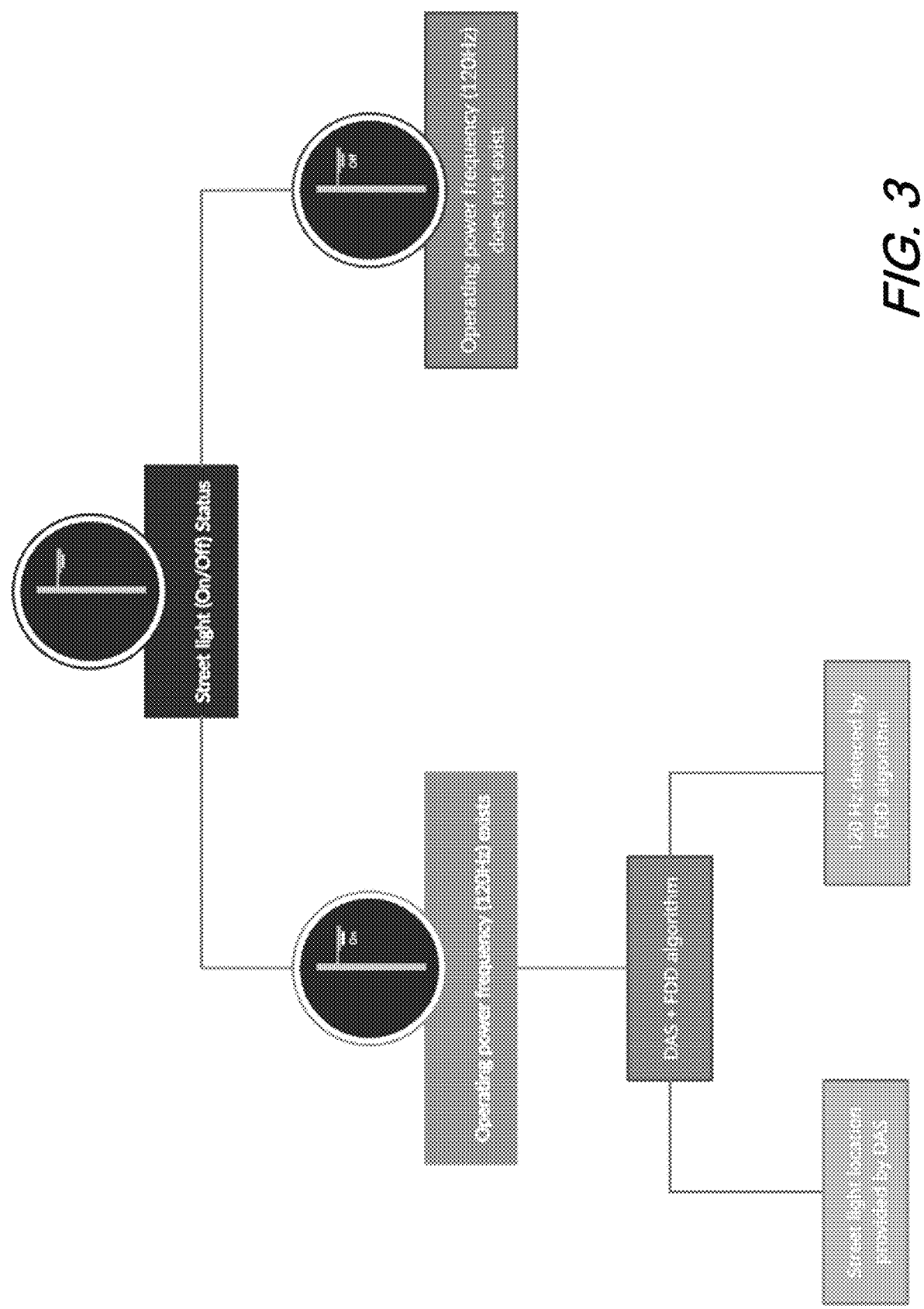
FIG. 3 is a schematic flow chart diagram illustrating working principle(s) of the DFOS/DAS street light status monitoring according to aspects of the present disclosure.

FIG. 3 is a schematic flow chart diagram illustrating working principle(s) of the DFOS/DAS street light status monitoring according to aspects of the present disclosure. With reference to that figure, it may be observed that street light (on/off) status is generally determined by the presence of a detectable operating power frequency (120 Hz). When that operating frequency does not exist and is not detected by operation of DFOS/DAS then it may be determined that the street light is off.

Operationally, our inventive method may be understood by a number of operational steps. At Step 1: A DFOS/DAS interrogator is interconnected to a suspended (aerial) fiber optic (cable) and continuously collecting strain signals along a length of a target route. Additional data signal processing including data quality check, filtering, windowing may also be applied in this step to confirm the validity of the raw data.

At Step 2: Perform a hammer test on utility poles having street lights for pole localization. In this step, a hammer or other mechanical impact is made to the utility pole(s) and pole information including pole dimension, pole tag, and GPS location, etc. are recorded as well, which provide information for quick localization of street light utility pole(s) when an outage happens.

Step 3: Localization—determination of utility pole location(s)—of utility poles suspending street lights are determined at locations along the fiber optic sensor cable, based on hammer test.

Operate the DFOS/DAS system and collect time series data for utility poles localized in Step 3.

At Step 5: Apply an FDD technique to the data collected in Step 4; by a) Estimating the power spectral density matrix $\hat{G}_{yy}(j\omega)$ at discrete frequencies $\omega=\omega_i$; b) Perform a singular value decomposition of the power spectral density, i.e. $\hat{G}_{yy}(j\omega_i)=U_i S_i U_i^H$ where $U_i=[u_{i1}, u_{i2}, \ldots, u_{im}]$ is a unitary matrix holding the singular values $u_{ij}$, $S_i$ is the diagonal matrix holding the singular values $s_{ij}$; and determine the 120 Hz dominating peaks in the power spectral density. This peak corresponds to the operating frequency of the street light.

Once the operating frequency of the street light is so determined and its utility pole location is determined and associated with the street light, the system may be continuously operated and when it is determined that the operating frequency of the street light is no longer present, an alarm may be generated to notify—for example—service personnel of an outage. Alternatively, continuous operation of the DFOS/DAS may determine the continuous operational status of street lights located along the DFOS/DAS route.

Figure 4:
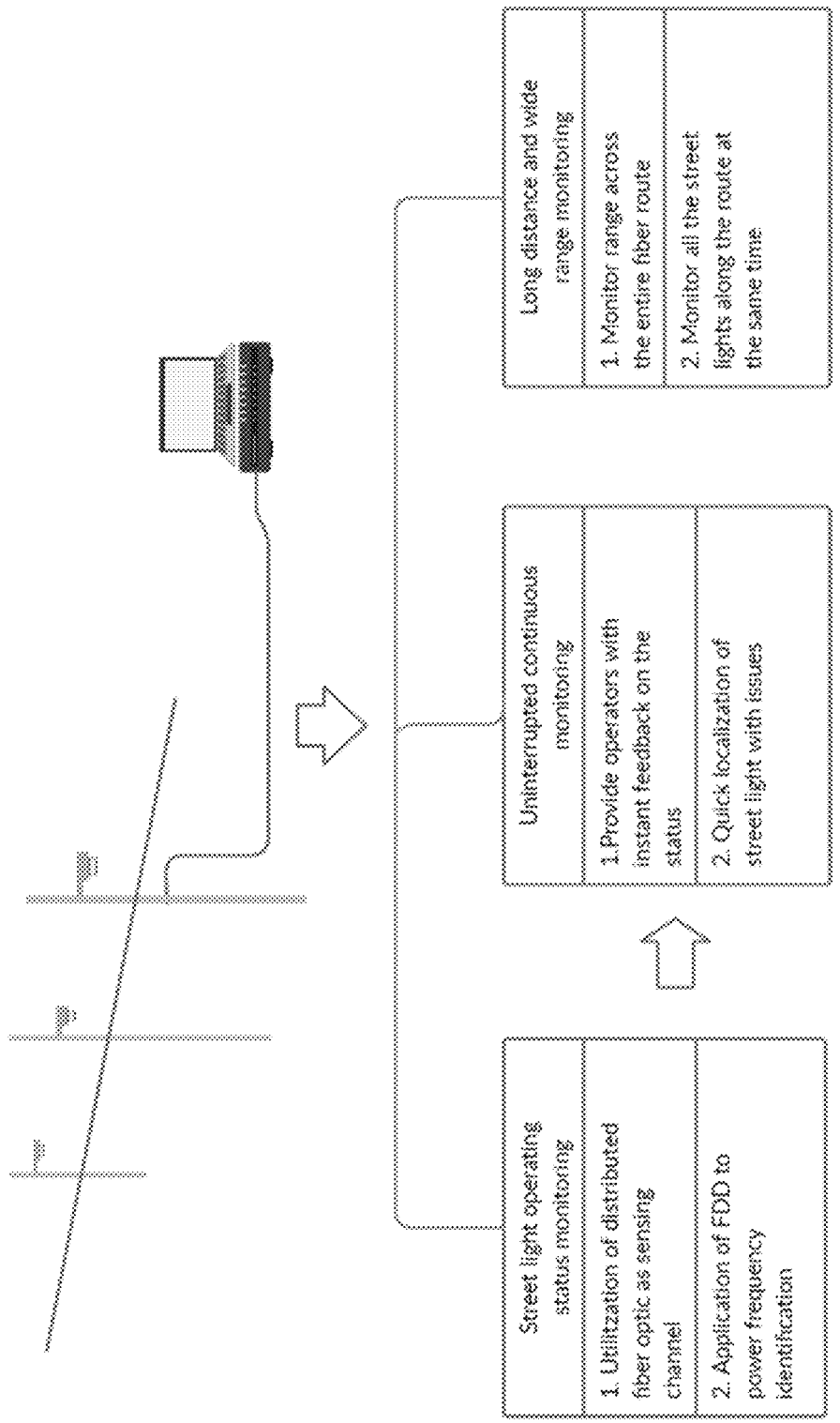
FIG. 4 is a schematic diagram illustrating overall features of the DFOS/DAS street light status monitoring according to aspects of the present disclosure.

FIG. 4 is a schematic diagram illustrating overall features of the DFOS/DAS street light status monitoring according to aspects of the present disclosure. As illustrated in that figure, street light operating status monitoring makes use of distributed fiber optic sensing/distributed acoustic sensing to monitor the street lights—coupled with FDD to identify power frequency(ies) associated with operation of the lights.

Uninterrupted continuous monitoring is advantageously performed and instant, real-time feedback with respect to the operational status of the street lights and localization of any outages may be made.

Finally, as will be understood and appreciated, DFOS/DAS advantageously operates over long distances thereby providing such long distance monitoring of street light status over an entire fiber optic route used as a DFOS sensor fiber. Of further advantage, all street lights along such route may be monitored simultaneously.

At this point, while we have presented this disclosure using some specific examples, those skilled in the art will recognize that our teachings are not so limited. Accordingly, this disclosure should be only limited by the scope of the claims attached hereto.

The invention claimed is:

1. A street light monitoring system comprising:
   a receiver that receives backscattered light containing a pattern indicating a state of the street light from an optical fiber laid by the street light; and
   an analyzer that analyzes whether street light is on or not based on the pattern indicating a state of the street light.

2. The street light monitoring system according to claim 1, wherein the analyzer detects whether the street light is on or not based on the vibration pattern indicating a state of the street light included in the backscattered light.

3. The street light monitoring system according to claim 1, wherein the analyzer detects a location of the street light based on comparison of a vibration pattern indicating a state of the street light included in the backscattered light.

4. A street light monitoring apparatus comprising:
   a receiver that receives backscattered light containing a pattern indicating a state of the street light from an optical fiber laid by the street light;
   a memory that includes stored instructions; and
   a processing unit configured to execute the instructions to analyze whether the street light is on or not based on the pattern indicating a state of the street light.

5. The street light monitoring apparatus according to claim 4, wherein the processing unit detects whether the street light is on or not based on a vibration pattern indicating a state of the street light included in the backscattered light.

6. The street light monitoring apparatus according to claim 4, wherein the processing unit executes the instructions and detects a location of the street light based on vibration patterns indicating a state of the street light included in the backscattered light.

7. A method for street light monitoring, the method comprising:
   receiving backscattered light containing a pattern indicating a state of a street light from an optical fiber laid by a street light;
   analyzing whether the street light is on or not based on the pattern indicating the state of the street light.

8. The method of street light monitoring according to claim 7, wherein the analyzing comprises comparing the vibration pattern indicating the state of the street light included in the backscattered light.

9. The method of street light monitoring according to claim 7, further comprising:
   detecting a location of the street light based on comparison of vibration patterns indicating a state of the street light included in the backscattered light.

10. The method of street light monitoring according to claim 8, further comprising:
    wherein the detecting comprises detecting a location based on whether or not to include vibrations in a 120 hertz band indicating a state of the street light included in the backscattered light.

* * * * *